United States Patent [19]

Baldwin et al.

[11] 4,246,569

[45] Jan. 20, 1981

[54] DIGITAL RECOGNITION CIRCUITS

[75] Inventors: John L. E. Baldwin, Croydon; Robert A. Bellis; John G. S. Ive, both of Winchester, all of England

[73] Assignee: Independent Broadcasting Authority, London, England

[21] Appl. No.: 68,176

[22] Filed: Aug. 20, 1979

Related U.S. Application Data

[63] Continuation of Ser. No. 864,010, Dec. 23, 1977, abandoned.

[30] Foreign Application Priority Data

Jul. 14, 1977 [GB] United Kingdom ............... 50791/77

[51] Int. Cl.³ .................................................. G06F 7/02
[52] U.S. Cl. .................................. 340/146.2; 364/900
[58] Field of Search ............... 364/200, 900 MS File; 340/146.34, 146.2; 235/92 CA

[56] References Cited

U.S. PATENT DOCUMENTS

| | | |
|---|---|---|
| 3,480,931 | 11/1969 | Geissler et al. .................. 364/900 |
| 3,919,531 | 11/1975 | Bobel et al. ..................... 235/92 CA |
| 3,999,164 | 12/1976 | Kashio .............................. 364/900 |
| 4,023,024 | 10/1977 | Bishop ............................. 364/423 |

*Primary Examiner*—Mark E. Nusbaum
*Assistant Examiner*—C. T. Bartz
*Attorney, Agent, or Firm*—Laubscher & Laubscher

[57] ABSTRACT

A circuit for monitoring digital data comprises a shift register for receiving the data to be monitored, the outputs of the shift register being fed either directly to the inputs of memory devices or via controllable gates. The memories are programmed to detect the number of logical 'ones' present in the shift register, and the detected number is compared with a reference to determine whether the data should be accepted or rejected. In one mode of operation, the controllable gates alter the inputs to the memories such that they are all the same when the correct data is in the shift register. In another mode of operation, the gates supply the memories with unaltered data and the circuit can detect errors because the data is coded in such a manner that each block of data should contain the same number of digits and the same number of logical 'ones'.

5 Claims, 1 Drawing Figure

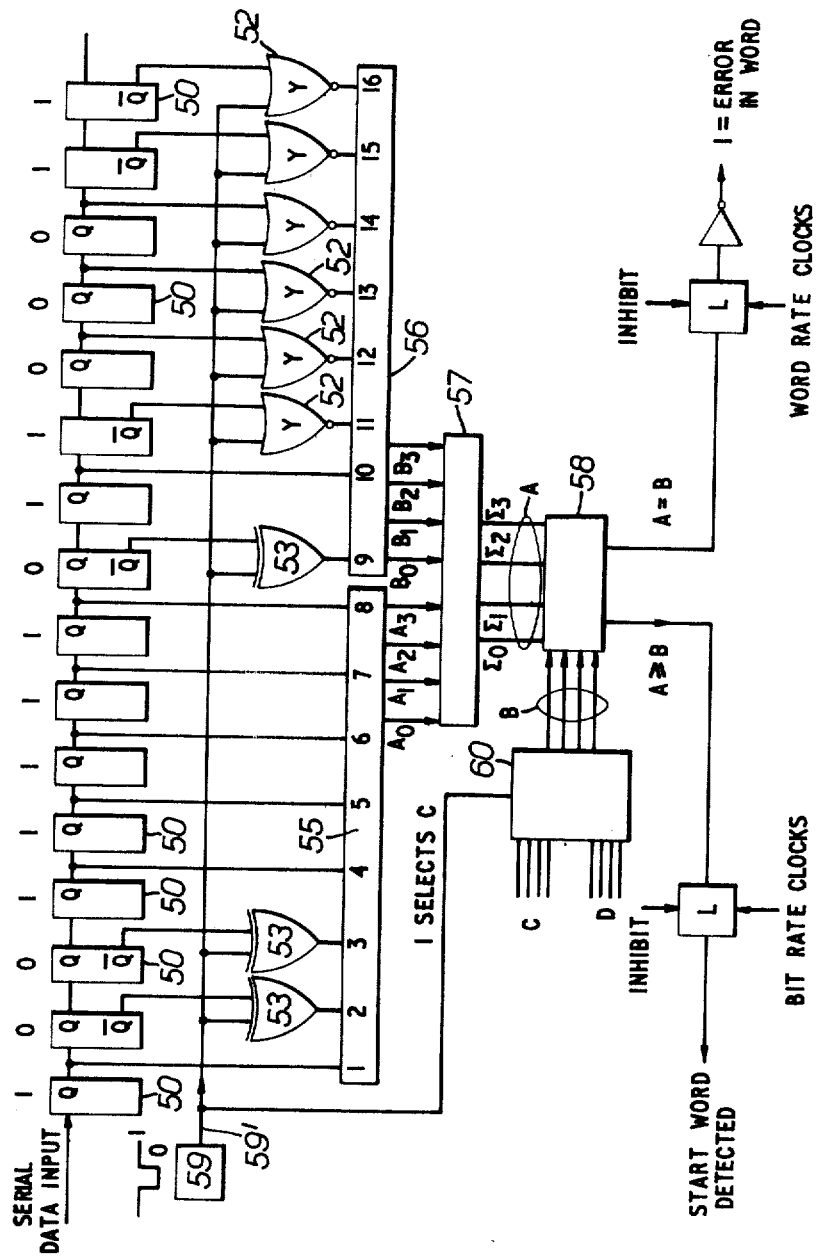

DIGITAL RECOGNITION CIRCUITS

This is a continuation of application Ser. No. 864,010, filed Dec. 23, 1977 now abandoned.

BRIEF DESCRIPTION OF THE PRIOR ART

The present invention relates to digital communications and more particularly, but not exclusively, to apparatus for detecting a particular sequence of digits and for detecting errors in the digits.

In digital communications which is meant to include digital recording and/or reproduction as well as digital transmission, information is transmitted in the form of words which consist of a number, often 4 and 8, of bits. The words are transmitted in series, and it is possible that due to errors in transmission or reception the whole of each word may not be received. Unless the reception or reproduction equipment can recognize errors and is given a reference from which to start, the information can become completely garbled.

In co-pending U.S. application to Ive et al Ser. No. 864,007 filed on even date, now U.S. Pat. No. 4,166,271, issued Aug. 28, 1979 apparatus is disclosed which will recognize a particular digital word. It would be advantageous if this apparatus would be improved so that not only would the apparatus recognize a particular word but would also check each word to see if it complied with certain criteria.

SUMMARY OF THE INVENTION

The present invention provides a circuit for monitoring digital words made up of a plurality of digits, comprising means for storing the digits of a digital word and having a plurality of outputs recognition means having a plurality of inputs connected to said outputs of said storage means for producing an output signal indicative of the number of correct digits stored, controllable switch means connecting at least some of said outputs to said inputs of said recognition means, comparison means for comparing said output signal with a reference signal and producing an indication of the result of the comparison, and control signal gennerating means connected to said controllable switch means for controlling the signals fed from said outputs of said storage means to said inputs.

BRIEF DESCRIPTION OF THE DRAWING

In order that the present invention be more readily understood, an embodiment thereof will now be described with reference to the accompanying single FIGURE of drawing, which shows:

A block diagram of apparatus for detecting both a particular sequence of digits and also any errors in subsequent digital information.

DETAILED DESCRIPTION

The drawing shows a block diagram of apparatus for detecting errors in digital information in general in addition to detecting a particular sequence digital word or words. The digital information preferably is derived from each line of a colour T.V. video scan and comprises a start word followed by a multiplicity of other words. In its mode as a start word detector the apparatus is similar to the copending U.S. application Ser. No. 864,007 of even date to Ive et al mentioned above now U.S. Pat. No. 4,166,271, issued Aug. 28, 1979. As a start word detector the apparatus is looking for a particular word fed serially into a shift register composed of flip-flops 50 in order to identify the start of a block of data or of a line of a video-scan. In the present instance, the shift register has a capacity of 16 bits and comprises 16 flip-flops. The outputs of the flip-flops are connected to two programmable read only memories 55,56 with certain of the connections being via logic gates 52,53 so that when the start word is in the shift register, the inputs to the memories will be all logical ones. As shown, when a 'zero' should be present in the start word, that flip-flop which should contain the 'zero' has its $\overline{Q}$ output connected through either a NOR gate 52 or an EXCLUSIVE OR gate 53. The reason for the different gates will become apparent later. The memories 55,56 each produce a 4 bit output indicative of the number of logical ones present in the shift register. Alternatively it could produce an output indicative of the number of logical zeros. More specifically each of the memories will produce a binary output indicative of a number from 0 to 8. The outputs from the memories 55,56 are added together by an adding circuit 57 and fed to inputs A of a comparator 58 where they are compared with a reference binary value fed to inputs B, the reference value being indicative of an acceptable limit to the number of correct bits in the shift register. The reference value may be the lower acceptable limit for the number of correct bits as shown in the diagram. In this case, if for example, the limit is 14, an output is produced from comparator 58 if the sum from memories 55,56 is greater than or equal to the reference value. Thus a maximum of two incorrect bits in the shift register will produce an output. Alternatively, the reference value may be the upper acceptable limit for the number of errors. Taking the same example as above, this is 2, and an output is produced if the sum from memories 55,56 produces a number of errors less than or equal to the reference value. In either case, the output from comparator 58 is fed to further circuitry and identifies the start of a line.

The clock signals for clocking the digital information into the shift register comprising the flip-flops 50 are derived from the digital data by conventional circuits (not shown). In the embodiment, the start word being detected is:

1 00 11 11 1 0 1 1 000 11

In order to extend the use of the circuit, the gates 53 are supplied with a control signal to one of their inputs so that the actual logical values contained in the flip-flops are fed to the memories. The control signal is produced by a control signal generator 59 and fed along a control line 59' and when the signal is a logical 'zero', the circuit operates as a start word detector whereas, when the signal is a logical 'one' the circuit operates as an error detector. This comes about because the memories are arranged to count the number of 'ones' in a digital word. If a code is chosen such that each word has a known number of 'ones' then an incorrect word can be identified.

In the particular embodiment, each information carrying, or data, word is a 10-bit word, thus only ten flip-flops 50 are required in the shift register. The last six flip-flops are negated by providing the control signal to the NOR gates 52. Error detection is based on the fact that the preferred embodiment utilizes a code such that each data word contains a predetermined number of 'ones' and 'zeros', in this case five 'ones' and five 'zeros'.

The circuit counts the number of logical 'ones' present in each word. In order to do this it is necessary to alter the inputs of the memories 55,56 so that the actual binary values of the numbers in the shift register are detected as opposed to a series of logical 'ones' produced by the circuitry in response to the start word recognition code. Thus any inverted outputs $\overline{Q}$ of flip-flops 50 are connected to the memories 55,56 through exclusive OR gates 53, with the control line 59' as the second input. With the control line at logical 'zero' in the start work recognition mode, the gates 53 transmit unchanged the logical values present at the inverted outputs $\overline{Q}$ of flip-flops 50. When the control line is at logical 'one' in the error detection mode, the gates 53 act as inverters of the inverted outputs of flip-flops 50 and thus the true values of the bits in the shift register are presented to the inputs of memories 55,56.

The memories 55,56 produce an output indicative of the number of logical 'ones' present in the shift register. The outputs from the memories 55,56 are added together by the adder 57 and compared in the comparator 58 with a reference value equal to the number of logical 'ones' expected in the code, in this case five. If there are five logical 'ones' present, the comparator 58 produces an output, if there are more or less than five, the comparator produces no output. This output is then inverted so that the apparatus generates an error signal whenever the number of logical 'ones' present in the shift register does not equal five.

It will be seen that input B of comparator 58 must be supplied with two distinct reference values, which value depends on the particular function of the apparatus at that time as defined by control line 59'. Thus control line 59' is connected to a reference value generator 60 which switches one of the two possible reference values to inputs B of comparator 58 in response to a logical 'one' on control line 59'.

The reference values are chosen depending on the number of bits in a word the code chosen and the required accuracy. Thus, in a start word recognition mode the reference value may be equal to or only slightly lower than the total number of bits in the start word, e.g. 14, 15 or 16.

The overall operation of the circuit is that after the circuit has been activated by the control signal generator 59 which may, for example, include a timer, bits of digital data are clocked through the flip-flops 50 until the apparatus detects a start word or until a predetermined period of time elapses. If a start word is not detected, all of the information between the undetected start word and the next detected start word, e.g. a whole line or ½ line of video signals is rejected. If a start word is detected, the bits comprising the start word are removed in parallel from the flip-flops 50 and the next ten bits of information are fed into the flip flops 50 with the apparatus now in its error detection mode. If these ten bits have the correct number of 'ones' that word is removed for further processing and the next ten bits checked, this process is continued until the circuits reverts to its start word detector mode just before the next start word is expected.

The embodiment is of general application in digital communications and can be used for audio as well as video signals. It is, of course, intended to be used in the playback or reception apparatus.

What we claim is:

1. A circuit for monitoring digital words made up of a plurality of binary digits, each word being coded to contain predetermined numbers of "ones" and "zeros", respectively, comprising
   (a) storage means having a plurality of sections (50) equal in number to the number of binary digits in a word, each section having an output;
   (b) recognition means (55, 56) having a plurality of inputs corresponding with the storage means outputs, said recognition means being operable in one of two modes, the first mode being a start word detector mode, in which a particular bit configuration is recognized, the second mode being an error detector mode, in which errors are detected by determining that the same number of digits have the same logical state in different blocks of data;
   (c) controllable gating means (52, 52) for selectively connecting at least some of said storage means outputs with said recognition means inputs, respectively, the remaining storage means outputs being directly connected with said recognition means inputs, respectively, said gating means being operable between a first condition in which said recognition means are connected with said storage means in the start word detector mode, and a second condition in which said recognition means are connected with said storage means in the error detector mode;
   (d) reference signal generator means (60) operable between first and second conditions for producing first and second reference signals corresponding with the number of bits in a word and the required accuracy, respectively;
   (e) control signal generating means (59) for simultaneously operating said controllable gating means and said reference signal generator means between said first and second conditions, respectively; and
   (f) comparator means (58) for comparing the output signal from said recognition means with the reference signal from said reference signal generator means.

2. Apparatus as defined in claim 1, wherein said recognition means comprises read only memory means operable to count the "ones" of the digital words.

3. Apparatus as defined in claim 1, wherein said recognition means comprises read only memory means operable to count the "zeros" of the digital words.

4. Apparatus as defined in claim 1, wherein said recognition means includes a pair of read only memory means, and further including adder circuit means (57) for adding together the outputs of said pair of memory means.

5. Apparatus as defined in claim 4, wherein said controllable gating means includes a plurality of EXCLUSIVE OR logic gates and a plurality of NOR logic gates, said NOR logic gates being operable to negate the operation of an excess number of sections of said storage means.

* * * * *